(12) United States Patent
Planque et al.

(10) Patent No.: US 12,264,397 B2
(45) Date of Patent: Apr. 1, 2025

(54) ASSEMBLY COMPRISING A SOEC/SOFC-TYPE SOLID OXIDE STACK AND A HIGH-TEMPERATURE SEALED COUPLING SYSTEM

(71) Applicant: COMMISSARIAT A L'ENERGIE ATOMIQUE ET AUX ENERGIES ALTERNATIVES, Paris (FR)

(72) Inventors: Michel Planque, Grenoble (FR); Thibault Monnet, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 509 days.

(21) Appl. No.: 17/761,170

(22) PCT Filed: Sep. 14, 2020

(86) PCT No.: PCT/FR2020/051584
§ 371 (c)(1),
(2) Date: Mar. 16, 2022

(87) PCT Pub. No.: WO2021/053288
PCT Pub. Date: Mar. 25, 2021

(65) Prior Publication Data
US 2023/0349052 A1    Nov. 2, 2023

(30) Foreign Application Priority Data

Sep. 18, 2019 (FR) ........................................ 1910287

(51) Int. Cl.
*H01M 8/12* (2016.01)
*C25B 1/042* (2021.01)
(Continued)

(52) U.S. Cl.
CPC ................ *C25B 1/042* (2021.01); *C25B 9/17* (2021.01); *C25B 9/63* (2021.01); *C25B 9/70* (2021.01);
(Continued)

(58) Field of Classification Search
CPC ....... H01M 2008/1293; H01M 4/9025; H01M 8/0273; H01M 8/0656; H01M 8/12;
(Continued)

(56) References Cited

U.S. PATENT DOCUMENTS

2009/0155671 A1   6/2009   Reytier et al.
2019/0013539 A1   1/2019   Reytier et al.
2019/0326621 A1   10/2019  Planque et al.

FOREIGN PATENT DOCUMENTS

EP    2 071 216 A1    6/2009
FR    2 151 186       4/1973
(Continued)

OTHER PUBLICATIONS

International Search Report mailed on Dec. 2, 2020 in PCT/FR2020/051584 filed on Sep. 14, 2020 (3 pages).
(Continued)

*Primary Examiner* — Victoria H Lynch
(74) *Attorney, Agent, or Firm* — Oblon, McClelland, Maier & Neustadt, L.L.P.

(57) ABSTRACT

An assembly includes a solid-oxide pack of the SOEC/SOFC type and a system for clamping the pack. The assembly furthermore includes a coupling system gastight at high temperature, including a clamping base with a first through internal pipe to enable a tube to pass, a support base located in the pipe and having a second through internal pipe, and a seal, having a C shape, positioned against a first end of the support base. One of the clamping plates includes a through pipe for gas to pass having a support surface for
(Continued)

the seal and a threaded countersink for receiving a thread of the clamping base.

13 Claims, 4 Drawing Sheets

(51) Int. Cl.
| | |
|---|---|
| *C25B 9/17* | (2021.01) |
| *C25B 9/63* | (2021.01) |
| *C25B 9/70* | (2021.01) |
| *C25B 11/077* | (2021.01) |
| *H01M 4/90* | (2006.01) |
| *H01M 8/0273* | (2016.01) |
| *H01M 8/0656* | (2016.01) |

(52) U.S. Cl.
CPC ......... *C25B 11/077* (2021.01); *H01M 4/9025* (2013.01); *H01M 8/0273* (2013.01); *H01M 8/0656* (2013.01); *H01M 8/12* (2013.01); *H01M 2008/1293* (2013.01)

(58) Field of Classification Search
CPC ..... H01M 8/2432; H01M 8/247; Y02E 60/36; Y02E 60/50
See application file for complete search history.

(56) References Cited

FOREIGN PATENT DOCUMENTS

| | | |
|---|---|---|
| FR | 3 045 215 A1 | 6/2017 |
| FR | 3 061 495 A1 | 7/2018 |
| JP | 2008-284505 A | 11/2008 |
| WO | WO 2019/122697 A1 | 6/2019 |

OTHER PUBLICATIONS

Preliminary French Search Report dated Apr. 3, 2020 in French Application 1910287 filed on Sep. 18, 2019 (2 pages, with Translation of Categories).

Berard, P. et al., "Viscoplastic behavior of a FeCrAl alloy for high temperature steam electrolysis (HTSE) sealing applications between 700° C. and 900° C.", Materials Science and Engineering A, Jan. 18, 2011, vol. 528, No. 12, pp. 4092-4097, XP028165865.

ASSEMBLY COMPRISING A SOEC/SOFC-TYPE SOLID OXIDE STACK AND A HIGH-TEMPERATURE SEALED COUPLING SYSTEM

TECHNICAL FIELD

The present invention relates to the general field of the high-temperature electrolysis of water (HTE), in particular the high temperature electrolysis of steam (HREV), respectively designated by the English terms "high temperature electrolysis" (HTE) and "high temperature steam electrolysis" (HTSE), the electrolysis of carbon dioxide ($CO_2$), or even the co-electrolysis of water at high temperature (HTE) with carbon dioxide ($CO_2$).

More precisely, the invention relates to the field of high-temperature solid-oxide electrolysers, normally designated by the acronym SOEC (standing for "solid oxide electrolyser cell").

It also relates to the field of high-temperature solid-oxide fuel cells, normally designated by the acronym SOFC (standing for "solid oxide fuel cells").

Thus, more generally, the invention relates to the field of solid-oxide packs of the SOEC/SOFC type operating at high temperature.

More precisely, the invention relates to an assembly comprising a solid-oxide pack of the SOEC/SOFC type and a system for the high-temperature sealed coupling of the pack, as well as a system comprising such an assembly and a furnace coupled to said pack by means of such a coupling system.

PRIOR ART

In the context of a high-temperature solid-oxide electrolyser of the SOEC type, it is a case of transforming, by means of an electric current, in one and the same electrochemical device, steam ($H_2O$) into dihydrogen ($H_2$) and dioxygen ($O_2$), and/or transforming carbon dioxide ($CO_2$) into carbon monoxide (CO) and dioxygen ($O_2$). In the context of a high-temperature solid-oxide fuel cell of the SOFC type, the operation is the opposite in order to produce an electric current and heat while being supplied with dihydrogen ($H_2$) and dioxygen ($O_2$), typically with air and natural gas, namely methane ($CH_4$). For reasons of simplicity, the following description privileges the operation of a high-temperature solid-oxide electrolyser of the SOEC type implementing the electrolysis of water. However, this operation is applicable to the electrolysis of carbon dioxide $CO_2$, or even the co-electrolysis of water at high temperature (HTE) with carbon dioxide ($CO_2$). In addition, this operation can be transposed to the case of a high-temperature solid-oxide fuel cell of the SOFC type.

To implement the electrolysis of water, it is advantageous to implement it at high temperature, typically between 60° and 1000° C., because it is more advantageous to electrolyse steam than liquid water and because part of the energy necessary for the reaction can be provided by heat, which is less expensive than electricity.

To implement the electrolysis of water at high temperature (HTE), a high-temperature solid-oxide electrolyser of the SOEC type consists of a pack of elementary patterns each including a solid-oxide electrolysis cell, or electrochemical cell, consisting of three anode/electrolyte/cathode layers superimposed on each other, and metal-alloy interconnection plates, also referred to as twin-pole plates or interconnectors. Each electrochemical cell is gripped between two interconnection plates. A high-temperature solid-oxide electrolyser of the SOEC type is then an alternating pack of electrochemical cells and interconnectors. A high-temperature solid-oxide fuel cell of the SOFC type consists of the same type of pack of elementary patterns. Since this high-temperature technology is reversible, the same pack can operate in electrolysis mode and produce hydrogen and oxygen from water and electricity, or in fuel cell mode and produce electricity from hydrogen and oxygen.

Each electrochemical cell corresponds to an electrolyte/electrode assembly, which is typically a multilayer ceramic assembly the electrolyte of which is formed by a central ion-conductive layer, this layer being solid, dense and gastight, and gripped between the two porous layers forming the electrodes. It should be noted that supplementary layers may exist, but which serve merely to improve one or more of the layers already described.

The interconnection devices, electrical and fluidic, are electron conductors that, from an electrical point of view, provide the connection of each electrochemical cell of an elementary pattern in the pack of elementary patterns, guaranteeing the electrical contact between one face and the cathode of one cell and between the other face and the anode of the following cell, and from a fluidic point of view, thus combining the production of each of the cells. The interconnectors thus provide the functions of bringing and collecting electric current and defining gas-circulation compartments, for distribution and/or collection.

More precisely, the main function of the interconnectors is to provide the passage of the electric current but also the circulation of the gases in the vicinity of each cell (namely: injected steam, hydrogen and oxygen extracted for the HTE electrolysis; air and fuel including the hydrogen injected and water extracted for an SOFC cell), and separating the anode and cathode compartments of two adjacent cells, which are the gas-circulation compartments at respectively the anodes and the cathodes of the cells.

In particular, for a high-temperature solid-oxide electrolyser of the SOEC type, the cathode compartment includes the steam and hydrogen, the product of the electrochemical reaction, while the anode compartment includes a draining gas, if present, and oxygen, another product of the electrochemical reaction. For a high-temperature solid-oxide fuel cell of the SOFC type, the anode compartment includes the fuel, while the cathode compartment includes the oxidant.

To implement the electrolysis of steam at high temperature (HTE), steam ($H_2O$) is injected into the cathode compartment. Under the effect of the electric current applied to the cell, the dissociation of the water molecules in the form of steam is achieved at the interface between the hydrogen electrode (cathode) and the electrolyte: this dissociation produces dihydrogen gas ($H_2$) and oxygen ions ($O^{2-}$). The dihydrogen ($H_2$) is collected and discharged at the outlet of the hydrogen compartment. The oxygen ions ($O^{2-}$) migrate through the electrolyte and recombine as dioxygen ($O_2$) at the interface between the electrolyte and the oxygen electrode (anode). A draining gas, such as air, can circulate at the anode and thus collect the oxygen generated in gaseous form at the anode.

To provide the operation of a solid-oxide fuel cell (SOFC), air (oxygen) is injected into the cathode compartment of the cell and hydrogen into the anode compartment. The oxygen of the air will dissociate into $O^{2-}$ ions. These ions will migrate in the electrolyte of the cathode to the anode to oxidise the hydrogen and form water with a simultaneous production of electricity. In an SOFC cell, just as in SOEC electrolysis, the steam is located in the dihydrogen ($H_2$) compartment. Only the polarity is reversed.

By way of illustration, FIG. 1 shows a schematic view showing the operating principle of a high-temperature solid-oxide electrolyser of the SOEC type. The function of such an electrolyser is to transform steam into hydrogen and oxygen in accordance with the following electrochemical reaction:

$$2H_2O \rightarrow 2H_2 + O_2.$$

This reaction is implemented electrochemically in the cells of the electrolyser. As shown diagrammatically in FIG. 1, each elementary electrolysis cell 1 is formed by a cathode 2 and an anode 4, placed on either side of a solid electrolyte 3. The two electrodes (cathode and anode) 2 and 4 are electron and/or ion conductors, made from porous material, and the electrolyte 3 is impervious to gas, insulating to electrons and conductive to ions. The electrolyte 3 may in particular be an ion conductor, more precisely an ion conductor of $O^{2-}$ ions, and the electrolyser is then referred to as an ionic electrolyser, in contradistinction to protonic electrolytes ($H^+$).

The electrochemical reactions take place at the interface between each of the electron conductors and the ion conductor.

At the cathode 2, the half reaction is as follows:

$$2H_2O + 4e^- \rightarrow 2H_2 + 2O^{2-}.$$

At the anode 4, the half reaction is as follows:

$$2O^{2-} \rightarrow O_2 + 4e^-.$$

The electrolyte 3, interposed between the two electrodes 2 and 4, is the site of migration of the $O^{2-}$ ions under the effect of the electrical field created by the difference in potential imposed between the anode 4 and the cathode 2.

As illustrated between parentheses on FIG. 1, the steam entering the cathode may be accompanied by hydrogen $H_2$, and the hydrogen produced and recovered at the outlet may be accompanied by steam. Likewise, as illustrated in broken lines, a draining gas, such as air, may furthermore be injected at the input to discharge the hydrogen produced. Injecting a draining gas has the additional function of fulfilling the role of thermal regulator.

An elementary electrolyser, or electrolysis reactor, consists of an elementary cell as described above, with a cathode 2, an electrolyte 3 and an anode 4, and two interconnectors that fulfil the functions of electrical, hydraulic and thermal distribution.

To increase the outputs of hydrogen and oxygen produced, stacking a plurality of elementary electrolysis cells one on the other, separated by interconnectors, is known. The assembly is positioned between two end interconnection plates that support the electrical feeds and gas feeds of the electrolyser (electrolysis reactor).

A high-temperature solid-oxide electrolyser of the SOEC type thus comprises at least one, and generally a plurality of, electrolysis cells stacked one on the other, each elementary cell being formed by an electrolyte, a cathode and an anode, the electrolyte being interposed between the anode and the cathode.

As indicated previously, the fluidic and electrical interconnection devices that are in electrical contact with one or more electrodes in general fulfil the functions of bringing and collecting electric current and delimit one or more gas-circulation compartments.

Thus, the function of the so-called cathode compartment is the distribution of the electric current and steam as well as the recovery of the hydrogen at the cathode in contact.

The function of the so-called anode compartment is the distribution of the electric current and the recovery of the oxygen produced at the anode in contact, optionally by means of a draining gas.

FIG. 2 shows an exploded view of elementary patterns of a high-temperature solid-oxide electrolyser of the SOEC type according to the prior art. This electrolyser includes a plurality of elementary electrolysis cells C1, C2, of the solid oxide type (SOEC), stacked in alternation with interconnectors 5. Each cell C1, C2 consists of a cathode 2.1, 2.2 and an anode (only the anode 4.2 of the cell C2 is shown), between which an electrolyte is disposed (only the electrolyte 3.2 of the cell C2 is shown).

The interconnector 5 is a component made from metallic alloy that provides the separation between the cathode 50 and anode 51 compartments, defined by the volumes lying between the interconnector 5 and the adjacent cathode 2.1 and between the interconnector 5 and the adjacent anode 4.2 respectively. It also provides the distribution of the gases to the cells. Steam is injected into each elementary pattern in the cathode compartment 50. The collection of the hydrogen produced and of the residual steam at the cathode 2.1, 2.2 is implemented in the cathode compartment 50 downstream of the cell C1, C2 after dissociation of the steam by the latter. The collection of the oxygen produced at the anode 4.2 is implemented in the anode compartment 51 downstream of the cell C1, C2 after dissociation of the steam by the latter. The interconnector 5 provides the passage of the current between the cells C1 and C2 by direct contact with the adjacent electrodes, i.e. between the anode 4.2 and the cathode 2.1.

The operating conditions of a high-temperature solid-oxide electrolyser (SOEC) being very similar to those of a solid-oxide fuel cell (SOFC), the same technological constraints are found again.

Thus, the correct operation of such solid-oxide packs of the SOEC/SOFC type operating at high temperature mainly requires satisfying the points stated below.

First of all, it is necessary to have electrical insulation between two successive interconnectors, otherwise the electrochemical cell would be short-circuited, but also good electrical contact and a sufficient contact surface between a cell and an interconnector. The lowest ohmic resistance possible is sought between cells and interconnectors.

Moreover, it is necessary to have impermeability between the anode and cathode compartments otherwise there would be a recombination of the gases produced, causing a reduction in yield and especially the appearance of hot spots damaging the pack.

Finally, it is essential to have a good distribution of the gases both at the inlet and in recovery of the products otherwise there will be a loss of efficiency, non-homogeneity of pressure and temperature in the various elementary patterns, or even degradations damaging to the electrochemical cells.

The incoming and outgoing gases in a high-temperature electrolysis pack (SOEC) or fuel cell (SOFC) operating a high temperature can be managed by means of suitable devices of a furnace such as the one illustrated with reference to FIG. 3.

The furnace 10 thus includes cold parts PF and hot parts PC, the latter comprising the furnace hearth 11, a looped tube 12 for managing the entries and exits of gas and the pack 20, also referred to as a stack, for high-temperature electrolysis (SOEC) or fuel cell (SOFC).

The gas feed and outlet devices are usually coupled at the cold parts PF, in particular by double-ring mechanical clamping couplings, surface sealing couplings by VCR® metal joint, welded connections or sealed partition passages.

In the case of double-ring mechanical clamping couplings, the two rings separate the tube sealing and clamping functions. The front ring creates a seal while the rear ring makes it possible to advance the front ring axially and applies effective clamping of the tube radially. This principle makes it possible to obtain very good tube clamping and very good impermeability to gas leakages. In addition, installing same is easy and it has very good resistance to fatigue caused by vibrations. Dismantling is easy in the case of absence of welding. However, its major drawbacks are precisely its absence of resistance to high temperatures so that the rear ring, the front ring and the tube may be welded together by diffusion welding making it impossible to dismantle the join.

In the case of surface sealing couplings by a VCR® metal joint, the seal is obtained when the joint is compressed by two rims during the clamping of a male nut and a hexagonal body with a female nut. This principle affords a very good seal, the possibility of using differential joints (nickel, copper, stainless steel, etc.) according to the most suitable configuration, and easy mounting/dismantling with change of the joint during these operations. However, this solution is not suitable at high temperature, since the operation thereof allows a maximum temperature of only approximately 537° C.

In the case of welded connections, a total seal is obtained by welding the tubes together by a method of the TIG type (standing for "tungsten inert gas") or by orbital welder, i.e. a TIG method coupled with a rotary nozzle. However, welding operations on a stack 20 mounted in a furnace 10 are very complicated because of the reduced accessibility for being able to weld the tubes on the periphery.

Finally, there is a coupling system resistant to a temperature of approximately 870° C., using gastight partition passages for sensors, probes, electrical signals and tubes to pass. These gastight partition passages are in the form of a threaded coupling made from 316L stainless steel that is screwed onto the wall of a pipe, of a vessel or of a cover. Depending on the version thereof, these passages accommodate one or more through elements, of various types, sizes and diameters. These passages therefore enable elements to pass without discontinuity and do not allow the gastight joining of two elements.

The couplings of the gas feed and outlet devices at the cold parts PF of the furnace 10 constitute a major drawback since these cold parts PF are remote from the heating elements of the furnace 10 and encumbered by the peripherals such as the exchangers, the insulators, the condensers, among other things. This involves privileging the production of the connections in the hot parts PF while wishing to make them easy to dismantle and reuse.

In addition, the use of the chamber of the furnace 10 for preheating the inlet gas also leads to implementing the looped tube 12, with a length of approximately 2.5 to 3 m, to use the radiation of the heating elements of the furnace 10, which adds complexity in the curvatures to ensure that the tubes arrive at the correct place in a confined space.

Furthermore, if it is wished to be able to dismantle the pack 20 to be able to operate it at another place, then conferring on it a character of the "Plug & Play" (PnP) type, it would be necessary first of all to break the connections mechanically, for example by means of a metal saw, and to prepare the new connections to put the pack 20 on another furnace, which greatly complicates the manipulations.

Finally, it should be noted that such a pack 20 is very fragile and it is necessary to implement the fewest possible operations during a change of location. Thus, it is necessary in particular to be able to avoid vibrations and impacts and also to avoid turning it over.

The coupling solutions mentioned previously do not make it possible to meet the requirements stated above. In particular, double-ring mechanical clamping couplings weld at high temperature. Welds do not meet the problem mentioned because of the complexity of welding (difficult access) and they do not avoid the cutting of tubes for dismantling.

The coupling solutions of the prior art do not make it possible to remove the pack 20 from a furnace 10 to be able to reconnect to another furnace 10, i.e. to have a "Plug & Play" character, without the breaking the joins mechanically, which obliges the operators responsible for the mounting/dismantling to perform tedious work of bending, coupling and adaptation.

From the French patent application FR 3 061 495 A1, an example is known of a demountable gastight system for connecting at high temperature in SOEC/SOFC mode. A mica joint is used between a smooth base and a threaded base to obtain demountable and reusable gastight connections. This system makes it possible to solve high-temperature coupling but may however involve an excessively high leakage rate. In addition, the mica joint may leave residues following the thermal cycling that it is then necessary to eliminate before mounting another joint.

There is still a need for improving the known coupling solutions of the prior art for a high-temperature electrolysis pack (SOEC) or fuel cell (SOFC).

DESCRIPTION OF THE INVENTION

The aim of the invention is to at least partially remedy the requirements mentioned above and the drawbacks relating to the embodiments of the prior art.

It aims in particular to implement an optimised design of coupling of a high-temperature electrolysis (SOEC) or fuel cell (SOFC) pack. In particular, it aims to produce in the hot part, i.e. inside the chamber of a furnace, and in line with the gas inlets and outlets, demountable and reusable connections that are gastight at 860°. This system must be able to be integrated in a pack having a character of the "Plug & Play" (PnP) type (self-clamping system), as described in the French patent application FR 3 045 215 A1.

Thus, the object of the invention, according to one of the aspects thereof, is an assembly, comprising:
- a solid-oxide pack of the SOEC/SOFC type operating at high temperature, including:
  - a plurality of electrochemical cells each formed by a cathode, an anode and an electrolyte interposed between the cathode and the anode, and a plurality of intermediate interconnectors each arranged between two adjacent electrochemical cells,
  - a system for clamping the solid-oxide pack of the SOEC/SOFC type, including a top clamping plate and a bottom clamping plate, between which the solid-oxide pack of the SOEC/SOFC type is clamped, each clamping plate including at least two clamping orifices, the clamping system furthermore including:
    - at least two clamping rods intended each to extend through a clamping orifice in the top clamping plate and through a corresponding clamping orifice in the bottom clamping plate to allow assembly of the top and bottom clamping plates with each other, clamping means at each clamping orifice of the top and bottom clamping plates intended to cooperate with said at least two clamping rods to allow the assembly of the top and bottom clamping plates with each other, characterised in that it furthermore includes:

at least one coupling system gastight at high temperature of the solid-oxide pack of the SOEC/SOFC type, mounted in at least one of the top and bottom clamping plates, including:

a clamping base, comprising a thread on its external surface at an end mounted in said at least one of the top and bottom clamping plates, the clamping base comprising a first through internal pipe to enable an inlet and/or outlet tube for gas to pass, a support base, located in the first internal pipe of the clamping base, a second end of which is intended to be attached to said inlet and/or outlet tube for gas, the support base comprising a second internal through pipe to allow passage of gas coming from said tube and/or from the solid-oxide pack of the SOEC/SOFC type, a seal, having a C shape, positioned against a first end, opposite to the second end, of the support base, and in that said at least one of the top and bottom clamping plates includes at least one through passage pipe for gas, intended to be in fluid communication with the solid-oxide pack of the SOEC/SOFC type and said inlet and/or outlet tube for gas, said at least one passage pipe comprising:

a surface for supporting the seal so that the seal is positioned between the support surface and the first end of the support base, a threaded countersink for receiving the thread of the clamping base.

The assembly according to the invention may furthermore include one or more of the following features taken in isolation or in accordance with all possible technical combinations.

The clamping base may include a first support surface, located in the first internal pipe. The support base may include a second support surface. The first and second support surfaces may then be in contact with each other in accordance with a contact of the plane-on plane type, formed in the direction of flow of the gas.

Moreover, the support base may include a housing, on the first end thereof, to at least partially house the seal.

The clamping base and the support base may be produced from the same material as said at least one of the top and bottom clamping plates.

Furthermore, the seal may be formed by a flexible metal joint in a C shape, comprising a core consisting of a metal helical spring with contiguous turns, a first metal envelope in which the spring is embedded.

The metal helical spring may have contiguous or non-contiguous turns. A spring with non-contiguous turns can provide more flexibility.

The flexible metal joint in a C shape may include a second metal envelope in which the first envelope is embedded. The presence of a second envelope may be advantageous since it will make it possible to follow any surface defects, giving rise to a better seal. Preferably, the second envelope is made from a more ductile material than the first envelope.

The first envelope may for example be made from a nickel-based superalloy. The second envelope may for example be made from gold or copper.

The assembly may include a top end plate and a bottom end plate, between which the plurality of electrochemical cells and the plurality of intermediate interconnectors are clamped.

In addition, said at least one of the top and bottom clamping plates may advantageously be manufactured by an additive manufacturing technique, in particular being produced from refractory austenitic steel, in particular of AISI 310 type.

Moreover, said at least one of the top and bottom clamping plates may have a thickness of between 20 and 30 mm, in particular of the order of 25 mm.

In addition, another object of the invention, according to another of the aspects thereof, is a system, characterised in that it includes:

an assembly as defined previously, a furnace, to which at least one gas inlet and/or outlet tube is connected, and to which the solid-oxide pack of the SOEC/SOFC type operating at high temperature is coupled for bringing and discharging gases by means of said at least one coupling system gastight at high temperature.

The support base may be welded, in particular by welding of the TIG type and/or by arc welding, on the end of said at least one gas inlet and/or outlet tube, in line therewith.

BRIEF DESCRIPTION OF THE DRAWINGS

The invention will be able to be understood better from the reading of the following detailed description of non-limitative example embodiments thereof, as well as from the examination of the schematic partial figures of the accompanying drawing, on which.

In all these figures, identical references can designate identical or similar elements.

In addition, the various parts shown in the figures are not necessarily shown to a uniform scale, to make the figures more legible.

Detailed Description of Particular Embodiments

Figure 1:
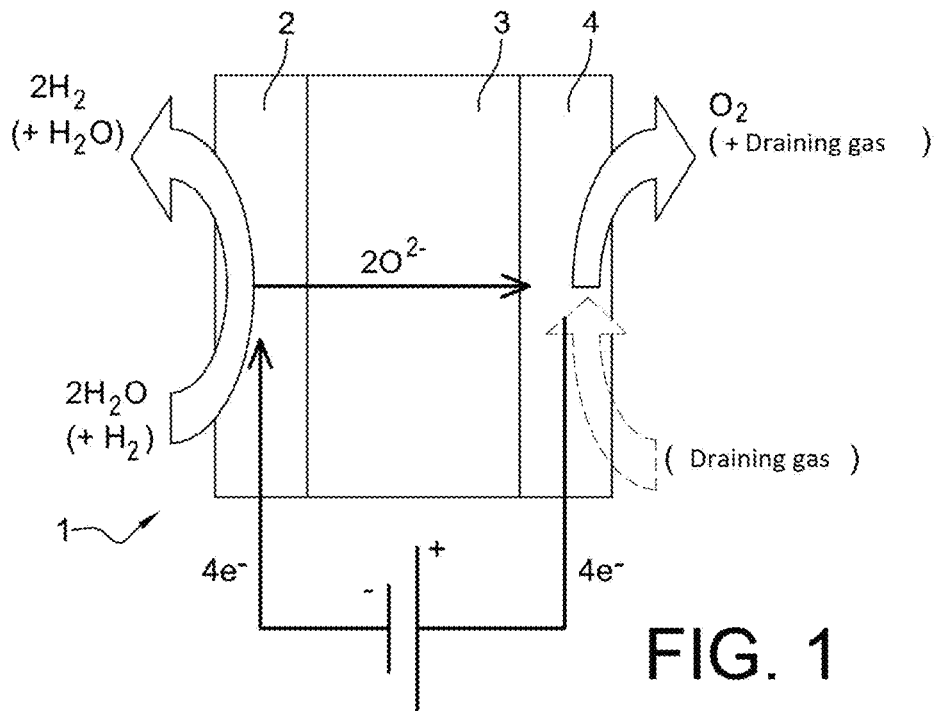
FIG. 1 is a schematic view showing the operating principle of a high-temperature solid-oxide electrolyser (SOEC)
Figure 2:
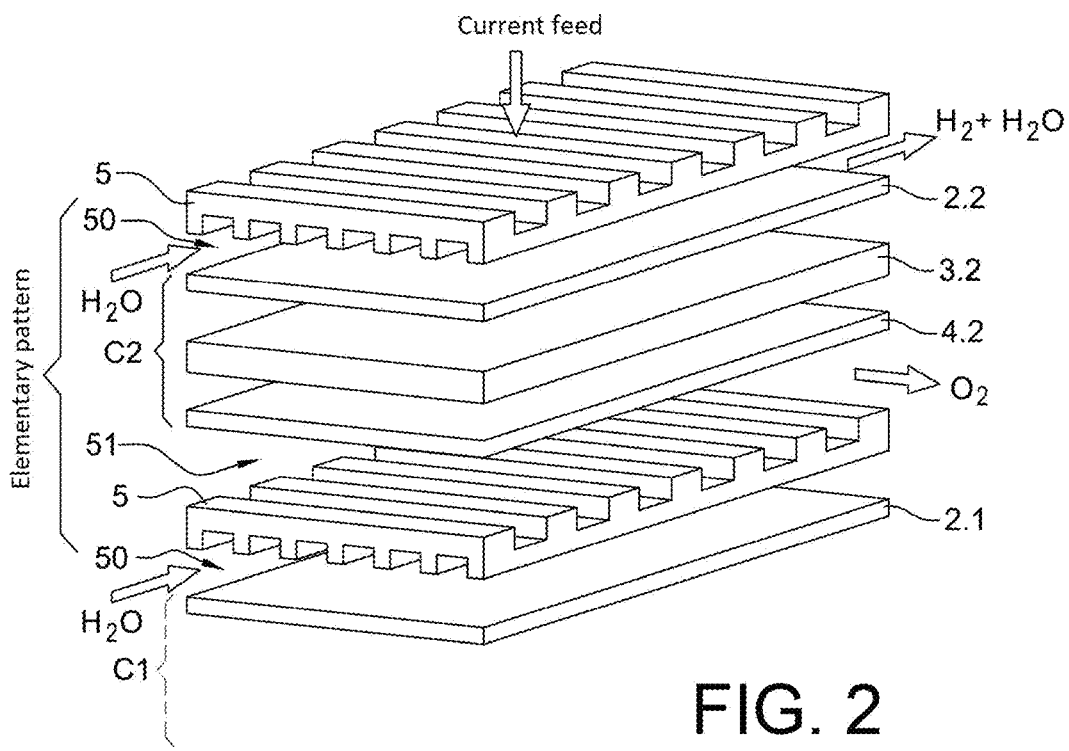
FIG. 2 is an exploded schematic view of a part of a high-temperature solid-oxide electrolyser (SOEC) comprising interconnectors according to the prior art.
Figure 3:
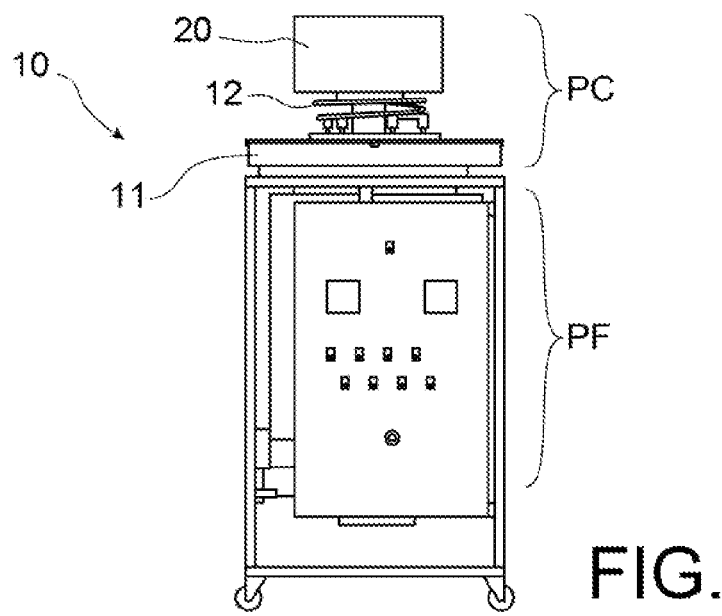
FIG. 3 illustrates the principle of the architecture of a furnace on which a high-temperature electrolysis pack (SOEC) or fuel cell pack (SOFC) operating at high temperature is placed.

FIGS. 1 to 3 have already been described above in the part relating to the prior art and to the technical context of the invention. For FIGS. 1 and 2, the symbols and the arrows for supplying steam $H_2O$, and for distributing and recovering dihydrogen $H_2$, oxygen $O_2$, air and electric current, are shown for purposes of clarity and accuracy, to illustrate the operation of the devices shown.

Furthermore, it should be noted that all the constituents (anode/electrolyte/cathode) of a given electrochemical cell are preferentially ceramic. The operating temperature of a pack of the high-temperature SOEC/SOFC type is more typically between 60° and 1000° C.

In addition, any terms "top" and "bottom" are to be understood here according to the normal direction of orientation of a pack of the SOEC/SOFC type when in its configuration of use.

Figure 4:
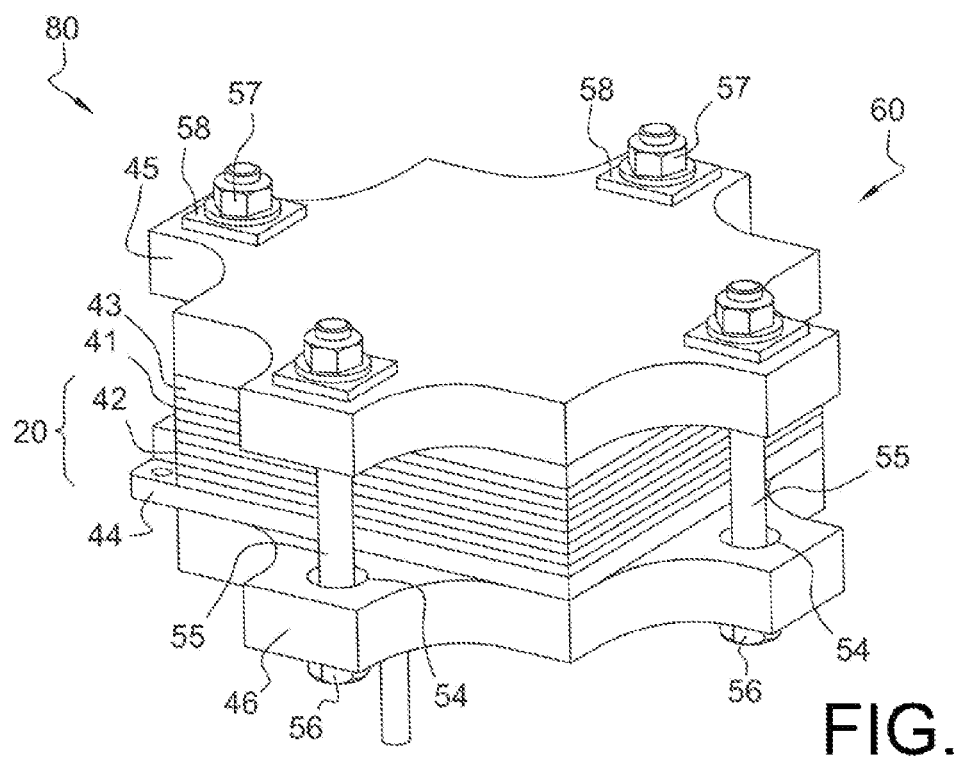
FIG. 4 shows, in perspective and by observation from above, an example of an assembly according to the invention comprising a solid-oxide pack of the SOEC/SOFC type and a system for clamping the pack, which may include a coupling system gastight at high temperature.
Figure 5:
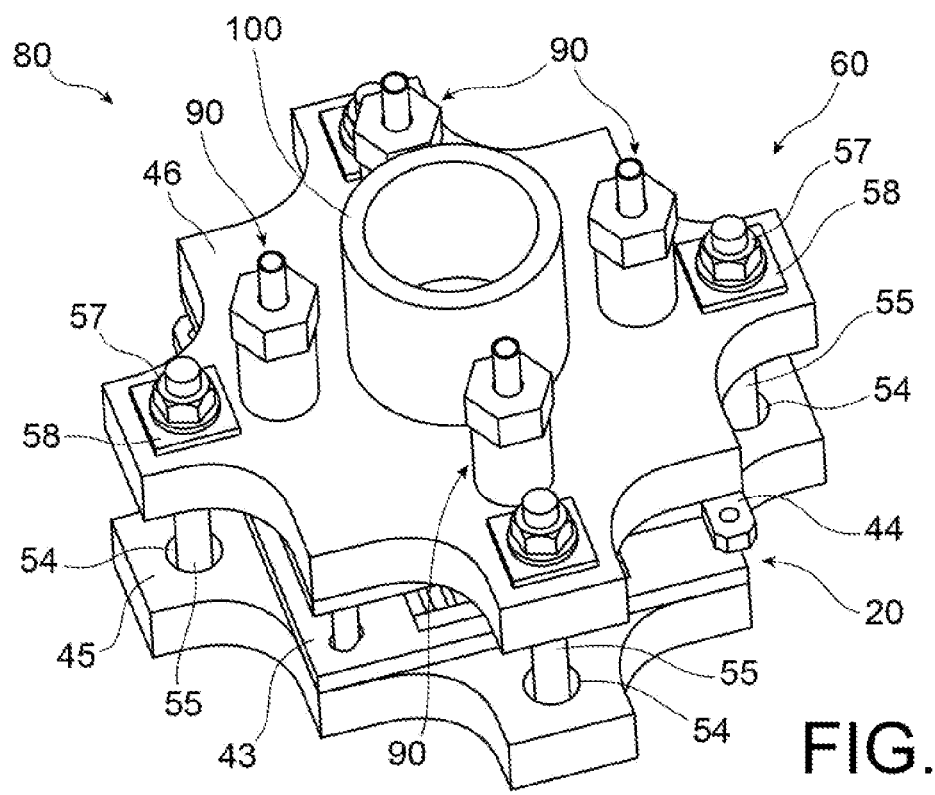
FIG. 5 shows, in perspective and by observation from below, another example of an assembly according to the invention comprising a solid-oxide pack of the SOEC/SOFC type and a system for clamping the pack, also comprising four coupling systems gastight at high temperature.
Figure 6:
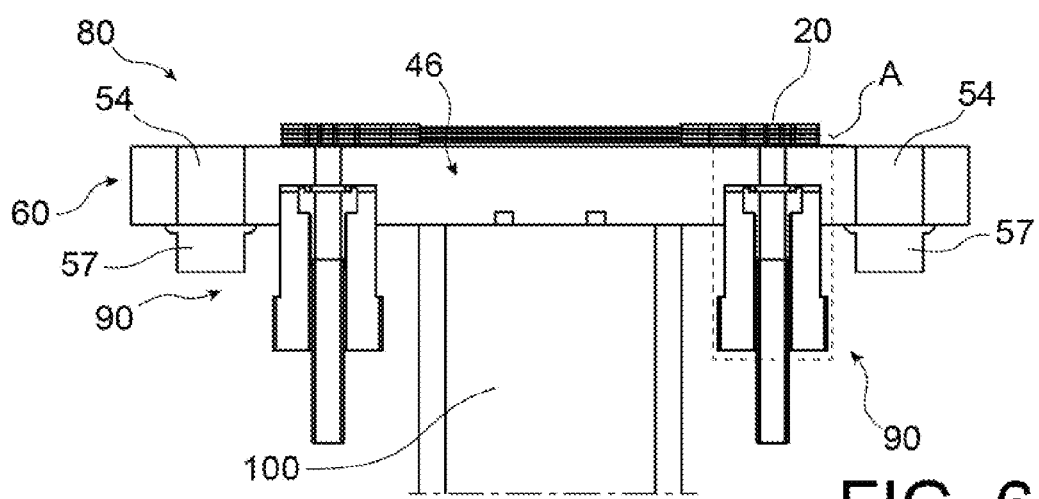
FIG. 6 shows, in a view in partial longitudinal section, a detail of the assembly of [FIG. 4] with the bottom clamping plate and two coupling systems gastight at high temperature.

With reference to FIG. 4, an example is illustrated of an assembly 80 comprising a solid-oxide pack 20 of the SOEC/SOFC type and a clamping system 60, this assembly 80 being able to comprise a coupling system 90 gastight at high temperature as described hereinafter with reference to FIGS. 5 to 7.

Advantageously, the assembly 80 according to the invention has a structure similar to that of the assembly described in the French patent application FR 3 045 215 A1, apart from the presence here of a coupling system 90 gastight at high temperature, i.e. the pack 20 has a character of the "Plug & Play" (PnP) type.

Thus, in a manner that is common to the various embodiments of the invention described hereinafter, and as can be seen in FIG. 4, the assembly 80 includes a solid-oxide pack 20 of the SOEC/SOFC type operating at high temperature.

This pack 20 includes a plurality of electrochemical cells 41 each formed by a cathode, an anode and an electrolyte interposed between the cathode and the anode, and a plurality of intermediate interconnectors 42 each arranged between two adjacent electrochemical cells 41. This assembly of electrochemical cells 41 and intermediate interconnectors 42 may also be designated by stack.

In addition, the pack 20 includes a top end plate 43 and a bottom end plate 44, respectively also referred to as top stack end plate 43 and bottom stack end plate 44, between which the plurality of electrochemical cells 41 and the plurality of intermediate interconnectors 42 are clamped, i.e. between which the stack is located.

Moreover, the assembly 80 also includes a system 60 for clamping the solid-oxide pack 20 of the SOEC/SOFC type, including a top clamping plate 45 and a bottom clamping plate 46, between which the solid-oxide pack 20 of the SOEC/SOFC type is clamped.

Each clamping plate 45, 46 of the clamping system 60 includes four clamping orifices 54.

In addition, the clamping system 60 furthermore includes four clamping rods 55, or tie rods, extending through a clamping orifice 54 in the top clamping plate 45 and through a corresponding clamping orifice 54 in the bottom clamping plate 46 to enable the top 45 and bottom 46 clamping plates to be assembled together.

The clamping system 60 also includes clamping means 56, 57, 58 at each clamping orifice 54 of the top 45 and bottom 46 clamping plates cooperating with the clamping rods 55 to enable the top 45 and bottom 46 clamping plates to be assembled together.

More precisely, the clamping means include, at each clamping orifice 54 in the top clamping plate 45, a first clamping nut 56 cooperating with the corresponding clamping rod 55 inserted through the clamping orifice 54. In addition, the clamping means include, at each clamping orifice 54 in the bottom clamping plate 46, a second clamping nut 57 associated with a clamping washer 58, these cooperating with the corresponding clamping rod 55 inserted through the clamping orifice 54. The clamping washer 58 is located between the second clamping nut 57 and the bottom clamping plate 46.

In accordance with the invention, the assembly 80 includes at least one coupling system 90, gastight at high temperature, of the pack 20, for example such as the one described with reference to FIGS. 5 to 7 but not visible in FIG. 4, mounted in the bottom clamping plate 46.

A description will now be given of such an example of a coupling system 90 gastight at high temperature with reference to FIGS. 5 to 7 relating to the same embodiment shown in different views. This coupling is implemented in the hot gas-inlet zone.

In this example, the assembly 80 includes four coupling systems 90 gastight at high temperature mounted on the bottom clamping plate 46, in proximity to the four clamping nuts 57.

Thus, these four clamping systems 90 gastight at high temperature, for coupling to the furnace 10, are distributed regularly around a support stud 100, secured to the bottom clamping plate 46, intended to allow the support of the assembly 80 in the furnace 10.

Figure 7:
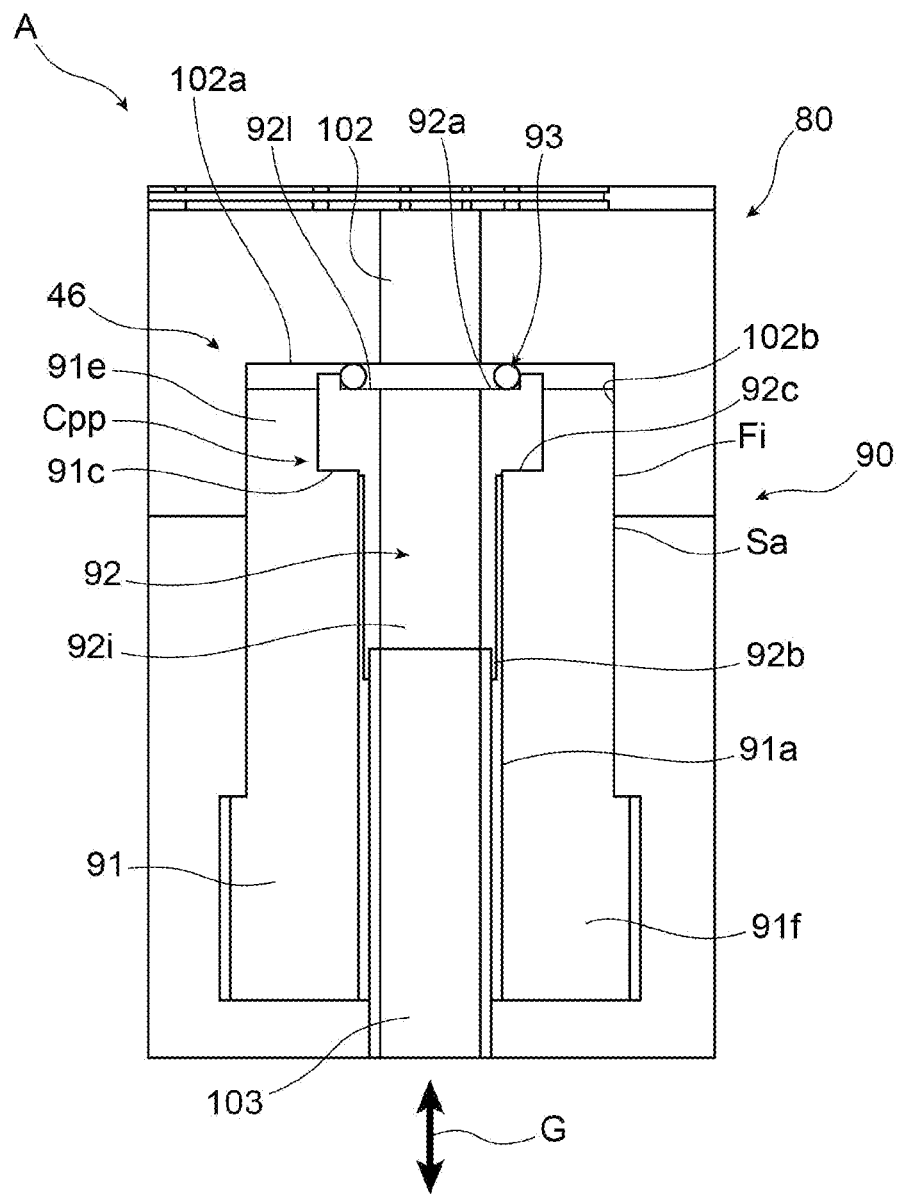
FIG. 7 shows, in an enlarged view of the zone A shown in [FIG. 6], a coupling system gastight at high temperature of the assembly of [FIG. 5].

As more particularly visible on FIG. 7, each gastight coupling system 90 includes first of all a clamping base 91. This clamping base 91 includes a first end 91e the external surface 5e of which is provided with a thread Fi, and a second opposite end 91f forming the screwing head of the clamping base 91. The first end 91e is mounted in the bottom clamping plate 46.

In addition, this clamping base 91 includes a first through internal pipe 91a, emerging on the first 91e and second 91f ends, which allows the passage of a tube 103 intended to provide the inlet and/or outlet of gas G.

Moreover, each gastight coupling system 90 also includes a support base 92. This support base 92 includes a first end 92a forming the head of the support base 92 and an opposite second end 92b. The support base 92 is located in the first internal pipe 91a of the clamping base 91. Its second end 92b is attached to the tube 103. For example, it may be attached welded, by TIG method or any other welding means, in line with the tube 103.

In addition, the support base 92 comprises a second through internal pipe 92i, emerging on the first 92a and second 92b ends, which allows the passage of gas G coming from the tube 103 and/or from the solid-oxide pack 20 of the SOEC/SOFC type.

When each gastight coupling system 90 is fitted, the clamping base 91 is preferentially slid onto the tube 103, while taking care to check the direction of introduction so that the thread cooperates with the threaded countersink 102b, described hereinafter, of the bottom clamping plate 46, before welding the support base 92 at the end of the tube 103.

Furthermore, each gastight coupling system 90 also includes a seal 93, preferentially metal, which has a C shape. This seal 93 is positioned against the first end 92a of the support base 92.

This seal 93 is distinguished from the normal static joints of the prior art, functioning rather as a flat joint between two flanges with very little or even no relative movement between them.

Advantageously, the seal 93 is formed by a flexible metal joint comprising: a core formed by a metal helical spring with contiguous turns closed on itself and, in the state of rest, having the form of a torus; a first envelope made from non-ductile metal in which the spring is embedded, this envelope having, in the state of rest, the form of a toric surface the generator circle of which does not close on itself; and a second envelope made from ductile metal in which the first envelope is embedded and also having, in the state of rest, the form of a toric surface the generator circle of which does not close on itself. Such an example of a seal is described in the French patent application FR 2 151 186 A1.

The seal 93 can be produced form a nickel-based superalloy, in particular of the Inconel 718 type. It may have an outside diameter of approximately 2.5 mm and an inside diameter of approximately 12.5 mm. It may be coated with gold and the clamping torque may be of the order of 12 N.m.

In order to be able to mount each gastight coupling system 90 on the bottom clamping plate 46, the latter includes a through pipe 102 for the passage of gas G, in fluid communication with the solid-oxide pack 20 of the SOEC/SOFC type and the inlet and/or outlet tube 103 for gas G.

As still visible in FIG. 7, this passage pipe 102 includes a support surface 102a for the seal 93 so that the seal 93 is positioned between the support surface 102a and the first end 92a of the support base 92.

In addition, the passage pipe 102 of the bottom clamping plate 46 also includes a threaded countersink 102b for receiving the thread Fi of the clamping base 91, and thus being able to mount each gastight coupling system 90 on the bottom clamping plate 46.

Thus each gastight coupling system 90 is assimilated to a system of the "screw/nut" type, the "screw" being formed by the clamping base 91 and the "nut" being formed by the threaded countersink 102b of the bottom clamping plate 46.

Advantageously, it should also be noted that the clamping base 91 includes a first support surface 91c, located in the first internal pipe 91a. Likewise, the support base 92 includes a second support surface 92c. Thus the first 91c and second 92c support surfaces are in contact with each other in accordance with a contact of the plane-on-plane $C_{PP}$ type, formed in the direction of flow of the gas G. It is therefore possible to have a plane-on-plane contact $C_{PP}$ when the threaded clamping base 91 is clamped in the threaded countersink 102b of the bottom clamping plate 46. This action will therefore compress the seal 93 on the countersink surface of the bottom clamping plate 46. It is then the clamping torque imparted by the clamping base 91 that provides the force necessary for the gastightness on the seal 93.

This join furthermore makes it possible to take up any defect in perpendicularity by means of the clearance that will be put between the support base 92 and the clamping base 91. The purpose is to be able to obtain an abutment distributed over the seal surface and the planar contact thereof with the bottom of the countersink.

Furthermore, the support base 92 includes a housing 921, on its first end 92a, to house the seal 93.

Advantageously, the clamping base 91 and the support base 92 are produced from the same material as the bottom clamping plate 46, especially from austenitic stainless steel, in particular of the 310S type. In this way, the thermal expansions are identical.

Moreover, the nominal diameter of the threaded clamping base 91 and of the threaded countersink 102b of the bottom clamping plate 46 can be M36.

Before fitting and clamping, the clamping base 91 and the threaded countersink 102b can be covered with anti-binding paste resistant to high temperature to facilitate dismantling and to avoid the phenomenon of diffusion welding in the threads during thermal cycling. This anti-binding paste also makes it possible to lubricate the connection and to withstand corrosion. It makes it possible to avoid the jamming and excessive wear of parts exposed to extreme temperatures or a so-called aggressive atmosphere, for example in the case of threads on thermal machines, manifolds for hot gases, burners, valves, disc brakes, spark plugs, exhaust shackles, rollers, bolts, collars, etc. Its formulation based on copper, aluminium and graphite can protect the metal parts and ensure dismantling thereof.

Various tests for testing the gastightness level were implemented with mica joints and metal seals. It became clear that the use of metal seals 93 with a C shape makes it possible to obtain the best gastightness over time while greatly limiting the leakage rate. In addition, they can be replaced easily.

Naturally, the invention is not limited to the example embodiments that have just been described. Various modifications can be made thereto by a person skilled in the art.

The invention claimed is:

1. An assembly, comprising:
 a solid-oxide pack of SOEC/SOFC type operating at high temperature, comprising:
  a plurality of electrochemical cells each formed by a cathode, an anode and an electrolyte interposed between the cathode and the anode, and a plurality of intermediate interconnectors each arranged between two adjacent electrochemical cells,
 a system for clamping the solid-oxide pack of the SOEC/SOFC type, including a top clamping plate and a bottom clamping plate, between which the solid-oxide pack of the SOEC/SOFC type is clamped, each clamping plate including at least two clamping orifices, the clamping system furthermore including:
  at least two clamping rods configured each to extend through a clamping orifice in the top clamping plate and through a corresponding clamping orifice in the bottom clamping plate to allow assembly of the top and bottom clamping plates with each other, and
  clamping means at each clamping orifice of the top and bottom clamping plates configured to cooperate with said at least two clamping rods to allow the assembly of the top and bottom clamping plates with each other,
 at least one coupling system gastight at high temperature of the solid-oxide pack of the SOEC/SOFC type, mounted in at least one of the top or bottom clamping plates, including:
  a clamping base, comprising a thread on its external surface at an end mounted in said at least one of the top or bottom clamping plates, the clamping base comprising a first through internal pipe to provide an inlet and/or outlet tube for gas to pass,
  a support base, located in the first internal pipe of the clamping base, a second end of which is configured to be attached to said inlet and/or outlet tube for gas, the support base comprising a second internal through pipe to allow passage of gas coming from said tube and/or from the solid-oxide pack of the SOEC/SOFC type, and a seal, having a C shape, positioned against a first end, opposite to the second end, of the support base, wherein said at least one of the top or bottom clamping plates includes at least one through passage pipe for gas, configured to be in fluid communication with the solid-oxide pack of the SOEC/SOFC type and said inlet and/or outlet tube for gas, said at least one passage pipe comprising:

a surface for supporting the seal so that the seal is positioned between the support surface and the first end of the support base, and a threaded countersink for receiving the thread of the clamping base, and wherein the seal is formed by a flexible metal joint in a C shape, comprising a core consisting of a metal helical spring and a first metal envelope in which the metal helical spring is embedded.

2. The assembly according to claim 1, wherein the clamping base includes a first support surface, located in the first internal pipe, and the support base includes a second support surface, the first and second support surfaces being in contact with each other in accordance with the contact of a plane-on-plane type, formed in a direction of flow of the gas.

3. The assembly according to claim 1, wherein the support base includes a housing, on its first end, for at least partially housing the seal.

4. The assembly according to claim 1, wherein the clamping base and the support base are produced from a same material as said at least one of the top or bottom clamping plates.

5. The assembly according to claim 1, wherein the flexible metal joint in the shape of a C comprises a second metal envelope in which the first envelope is embedded.

6. The assembly according to claim 1, comprising a top end plate and a bottom end plate, between which the plurality of electrochemical cells and the plurality of intermediate interconnectors are gripped.

7. The assembly according to claim 1, wherein said at least one of the top or bottom clamping plates is manufactured by an additive manufacturing technique.

8. The assembly according to claim 1, wherein said at least one of the top or bottom clamping plates has a thickness of between 20 and 30 mm.

9. A system comprising:

an assembly according to claim 1, and a furnace, to which at least one inlet and/or outlet tube for gas is connected, and to which the solid-oxide pack of the SOEC/SOFC type operating at high temperature is coupled for feeding and discharging gases using said at least coupling system gastight at high temperature.

10. The system according to claim 9, wherein the support base is welded on an end of said at least one inlet and/or outlet tube for gas, in line therewith.

11. The system according to claim 9, wherein the support base is welded by one of TIG type welding or arc welding.

12. The assembly according to claim 1, wherein said at least one of the top or bottom clamping plates is manufactured by an additive manufacturing technique from refractory austenitic steel.

13. The assembly according to claim 1, wherein said at least one of the top or bottom clamping plates has a thickness of an order of 25 mm.

* * * * *